United States Patent
Yoshida

(10) Patent No.: US 12,206,328 B2
(45) Date of Patent: Jan. 21, 2025

(54) DC-DC CONVERTER AND POWER SUPPLY DEVICE

(71) Applicant: Panasonic Intellectual Property Management Co., Ltd., Osaka (JP)

(72) Inventor: Koji Yoshida, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 548 days.

(21) Appl. No.: 17/607,022

(22) PCT Filed: May 21, 2020

(86) PCT No.: PCT/JP2020/020074
§ 371 (c)(1),
(2) Date: Oct. 27, 2021

(87) PCT Pub. No.: WO2021/005894
PCT Pub. Date: Jan. 14, 2021

(65) Prior Publication Data
US 2022/0216790 A1    Jul. 7, 2022

(30) Foreign Application Priority Data
Jul. 5, 2019   (JP) .................................. 2019-125988

(51) Int. Cl.
*H02M 3/158*    (2006.01)
*H02J 7/00*     (2006.01)
(Continued)

(52) U.S. Cl.
CPC ........... *H02M 3/158* (2013.01); *H02J 7/0013* (2013.01); *H02J 7/0063* (2013.01); *H02J 7/342* (2020.01); *B60L 50/60* (2019.02); *B60L 2210/10* (2013.01)

(58) Field of Classification Search
CPC .. H02M 3/158; H02M 3/1582; H02M 3/1586; H02M 3/157; H02M 3/1563;
(Continued)

(56) References Cited

U.S. PATENT DOCUMENTS

| | | | |
|---|---|---|---|
| 2011/0121801 A1* | 5/2011 | Scaldaferri | H02M 3/156 323/276 |
| 2012/0091978 A1* | 4/2012 | Ishii | H02M 1/36 323/271 |
| 2015/0162771 A1 | 6/2015 | Monden et al. | |

FOREIGN PATENT DOCUMENTS

| | | |
|---|---|---|
| EP | 2782206 B1 | 3/2017 |
| JP | 2002-112534 | 4/2002 |

OTHER PUBLICATIONS

International Search Report of PCT application No. PCT/JP2020/020074 dated Jul. 28, 2020.
(Continued)

*Primary Examiner* — Nguyen Tran
(74) *Attorney, Agent, or Firm* — WHDA, LLP

(57) ABSTRACT

In a DC-DC converter, a controller is configured to provide control cycles subsequently. Each of the control cycles includes a first ON-period and a second ON-period subsequent to the first ON-period. One switching element is turned on, and another switching element is turned off the first ON-period. The one switching element is turned off, and the another switching element is turned on for the second ON-period. A controller is configured to determine lengths of the first and second ON-periods based on high-side and low-side voltages. The controller is configured to turn on the one switching element in an initial ON-duration in the first ON-period of a control cycle among the control cycles which is firstly provided. The initial ON-duration has a length shorter than the determined length of the first ON-period. The controller turns off the one and another switch-
(Continued)

ing elements in a duration in the first ON-period in the first control cycle other than the initial ON-duration. The controller is configured to turn on the one switching element and turn off the another switching element for the determined length of the first ON-period of each of one or more control cycles among the control cycles other than the first control cycle. The controller is configured to turn off the one switching element and turn on the another switching element for the determined length of the second ON-period of each of the control cycles.

11 Claims, 5 Drawing Sheets

(51) Int. Cl.
  *H02J 7/34* (2006.01)
  *B60L 50/60* (2019.01)
(58) Field of Classification Search
  CPC .......... H02M 3/156; H02J 7/342; H02J 7/345; H02J 7/0063; H02J 7/0068; H02J 7/007
  See application file for complete search history.

(56) References Cited

OTHER PUBLICATIONS

The Extended European Search Report dated Jul. 22, 2022 for the related European Patent Application No. 20836480.2. (10 pages).

* cited by examiner

DC-DC CONVERTER AND POWER SUPPLY DEVICE

TECHNICAL FIELD

The present invention relates to a DC-DC converter and a power supply device to be used in various electronic devices.

BACKGROUND ART

FIG. 5 is a circuit block diagram of a conventional power supply device. Power supply device 1 includes batteries 2 and 3, switching elements 4 and 5 disposed between batteries 2 and 3, and reactor 6.

In start-up of power supply device 1, the ratio of an ON time for switching element 4 to an ON time for switching element 5 is determined based of voltages of batteries 2 and 3, and switching elements 4 and 5 are started to turn on and off.

A conventional power supply device similar to power supply device 1 is disclosed in, for example, PTL 1.

CITATION LIST

Patent Literature

PTL 1: Japanese Patent Laid-Open Publication No. 2002-112534

SUMMARY

A DC-DC converter includes a first switching element, a second switching element having one end connected to one end of the first switching element at a node, a high-voltage positive end connected to another end of the first switching element, a high-voltage negative end connected to another end of the second switching element, a low-voltage negative end connected to the another end of the second switching element, an inductance element having one end connected to the node, a low-voltage positive end connected to another end of the inductance element, a start-up signal receiver configured to receive a start-up signal, and a controller configured to turn on the first switching element and the second switching element complementarily. The controller is configured to provide a plurality of control cycles subsequently in response to the start-up signal received by the start-up signal receiver, each of the plurality of control cycles consisting of a first ON-period and a second ON-period subsequent to the first ON-period. The controller is configured to turn on one of the first switching element and the second switching element and turn off another of the first switching element and the second switching element for the first ON-period. The controller is configured to turn off the one of the first switching element and the second switching element and turn on the another of the first switching element and the second switching element for the second ON-period. The controller is configured to determine a length of the first ON-period and a length of the second ON-period based on a high-side voltage between the high-voltage positive end and the high-voltage negative end and a low-side voltage between the low-voltage positive end and the low-voltage negative end. The controller is configured to turn on the one of the first switching element and the second switching element in an initial ON-duration in the first ON-period of a first control cycle among the plurality of control cycles which is firstly provided among the plurality of control cycles, the initial ON-duration having a length shorter than the determined length of the first ON-period, and turn off the first switching element and the second switching element in a duration of the first ON-period of the first control cycle other than the initial ON-duration. The controller is configured to turn on the one of the first switching element and the second switching element and turn off the another of the first switching element and the second switching element for the determined length of the first ON-period of each of one or more control cycles among the plurality of control cycles other than the first control cycle. The controller is configured to turn off the one of the first switching element and the second switching element and turn on the another of the first switching element and the second switching element for the determined length of the second ON-period of each of the plurality of control cycles.

This DC-DC converter suppresses unnecessary current and unnecessary power output during at its start-up.

DESCRIPTION OF EMBODIMENT

Figure 1:
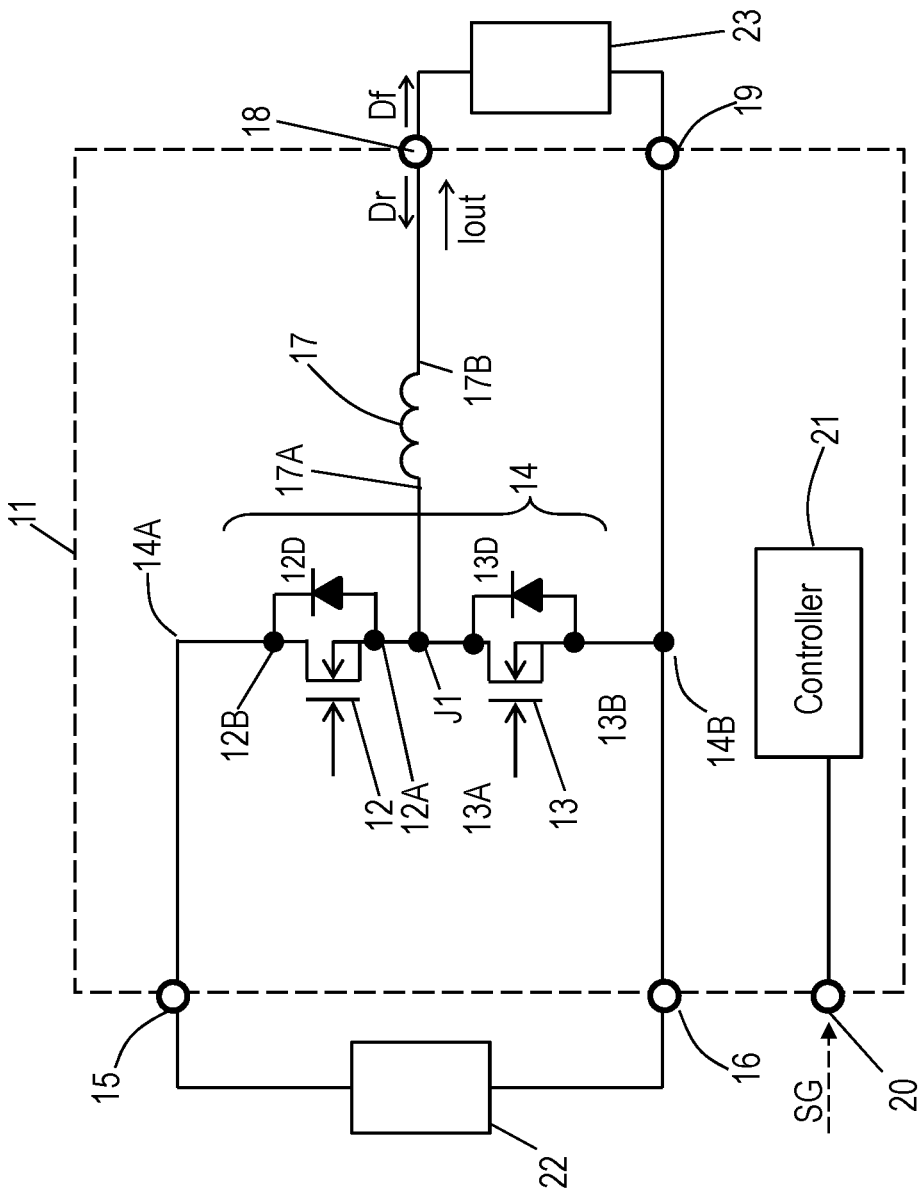
FIG. 1 is a circuit block diagram of a DC-DC converter according to an exemplary embodiment.

FIG. 1 is a circuit block diagram of a DC-DC converter 11 according to an exemplary embodiment of the present invention. DC-DC converter 11 includes series assembly 14 of switching elements 12 and 13 connected in series to each other, high-voltage positive end 15, high-voltage negative end 16, inductance element 17, low-voltage positive end 18, low-voltage negative end 19, start-up signal receiver 20, and controller 21.

High-voltage positive end 15 is connected to one end 14A of series assembly 14. High-voltage negative end 16 is connected to another end 14B of series assembly 14. One end of inductance element 17 is connected to node J1 at which switching element 12 is connected to switching element 13. Another end of inductance element 17 is connected to low-voltage positive end 18. Low-voltage negative end 19 is connected to high-voltage negative end 16 or another end 14B of series assembly 14.

Switching element 12 includes one end 12A and another end 12B. Switching element 13 includes one end 13A and another 13B. One end 13A of switching element 13 is connected to one end 12A of switching element 12 at node J1. High-voltage positive end 15 is connected to another end 12B of switching element 12. High-voltage negative end 16 is connected to another end 13B of switching element 13. Low-voltage negative end 19 is connected to another end 13B of switching element 13. Inductance element 17 includes one end 17A and another end 17B. One end 17A of inductance element 17 is connected to node J1. Low-voltage positive end 18 is connected to another end 17B of inductance element 17.

Start-up signal receiver 20 is configured to receive start-up signal SG. Controller 21 is configured to detect start-up signal SG via start-up signal receiver 20. Controller 21 is configured to detect high-side voltage VH between high-voltage positive end 15 and high-voltage negative end 16. Controller 21 is configured to detect low-side voltage VL between low-voltage positive end 18 and low-voltage negative end 19. Controller 21 is configured to determine a length of an ON-period of switching elements 12 and 13 in each of control cycles T repeating subsequently at predetermined time intervals. Controller 21 is configured to determine a duty (the ratio of the ON-period to a length of control cycle T) of switching elements 12 and 13, thereby controlling an operation of switching elements 12 and 13.

Upon detecting start-up signal SG, controller 21 detects high-side voltage VH to obtain high voltage value VH1, and detects low-side voltage VL to obtain low voltage value VL1. Controller 21 then determines length LT1 of ON-period Ton1 in which switching element 12 is turned on and length LT2 of ON-period Ton2 in which switching element 13 is turned on based on high voltage value VH1 and low voltage value VL1. Controller 21 decreases a length of a preceding period of ON-periods Ton1 and Ton2 of first control cycle Tf among control cycles T that follows the detection of start-up signal SG.

Controller 21 turns on and off switching elements 12 and 13 complementarily. That is, controller 21 turns on switching element 12 and turns off switching element 13 for ON-period Ton1. Controller 21 turns off switching element 12 and turns on switching element 13 on for ON-period Ton2.

The above configuration and operation suppress a steady current flowing averagely in one of switching elements 12 and 13 that has been turned on firstly at the start-up of DC-DC converter 11. Since the steady current flowing averagely in the switching element that has been turned on first at the start-up of DC-DC converter 11 is suppressed within a short period of time through the simple control, DC-DC converter 11 is controlled substantially in a balanced state in which no current flows in any direction. Thus, undesired power is no supplied to high-voltage positive end 15, high-voltage negative end 16, low-voltage positive end 18, and low-voltage negative end 19. This suppresses adverse effects, such as degradation of characteristics high-voltage battery 22 connected to high-voltage positive end 15 and high-voltage negative end 16 and degradation of characteristics of low-voltage battery 23 connected low-voltage positive end 18 and low-voltage negative end 19.

Figure 5:
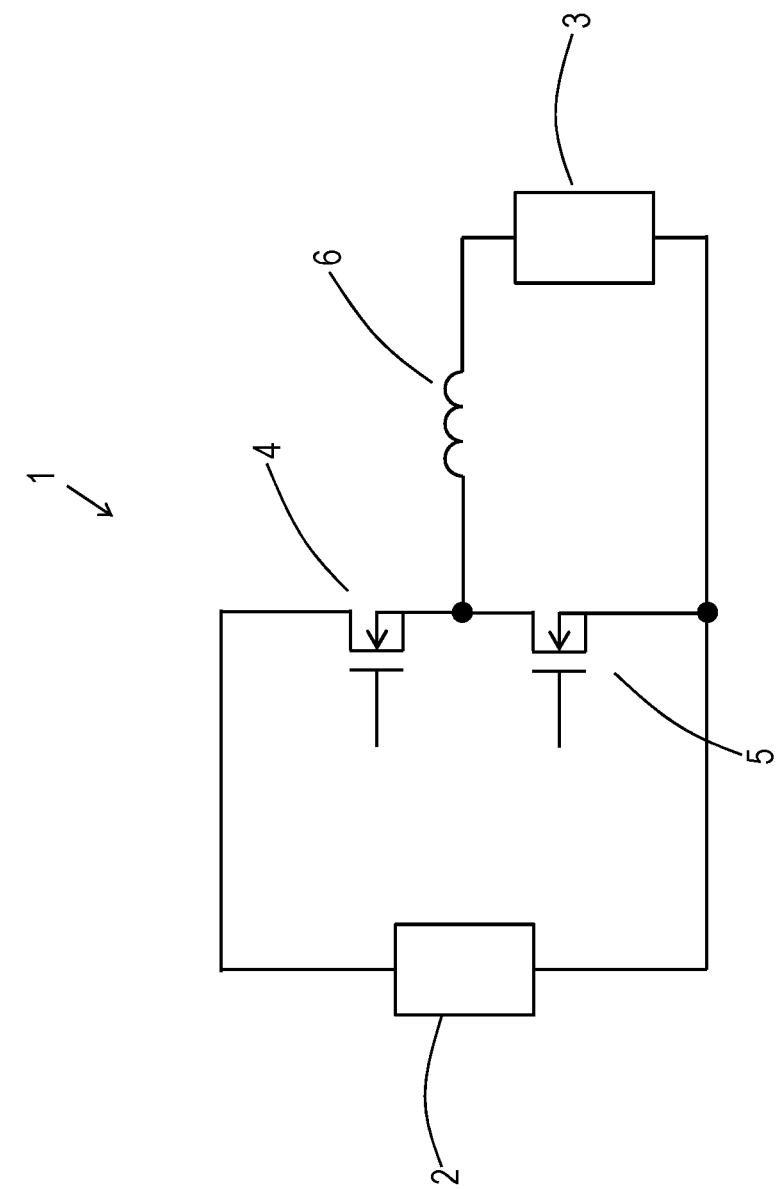
FIG. 5 is a circuit block diagram of a conventional power supply device.

In conventional power supply device 1 illustrated in FIG. 5, a reference time ratio of the ON time for switching element 4 to the ON time for switching element 5 is determined bases on a ratio of the voltage of battery 2 to the voltage of battery 3, and then, the ON and OFF operation of switching elements 4 and 5 is started and continued. However, a biased current flows in one of switching elements 4 and 5 that has been turned on first at the start-up of power supply device 1, flowing as an initial steady current through reactor 6.

Accordingly, in order to reduce the initial steady-state current to zero, the respective ON times of switching elements 4 and 5 are temporarily controlled with a time ratio value different from the determined reference time ratio, which is based on the ratio between the voltages of batteries 2 and 3. Then, when the average current becomes zero, controlled time ratio switching is needed for using the reference time ratio again. Moreover, unwanted charging and discharging with the average current is involved in every start-up of power supply device 1 and may promote deterioration of connected batteries 2 and 3 of power supply device 1.

Figure 2:
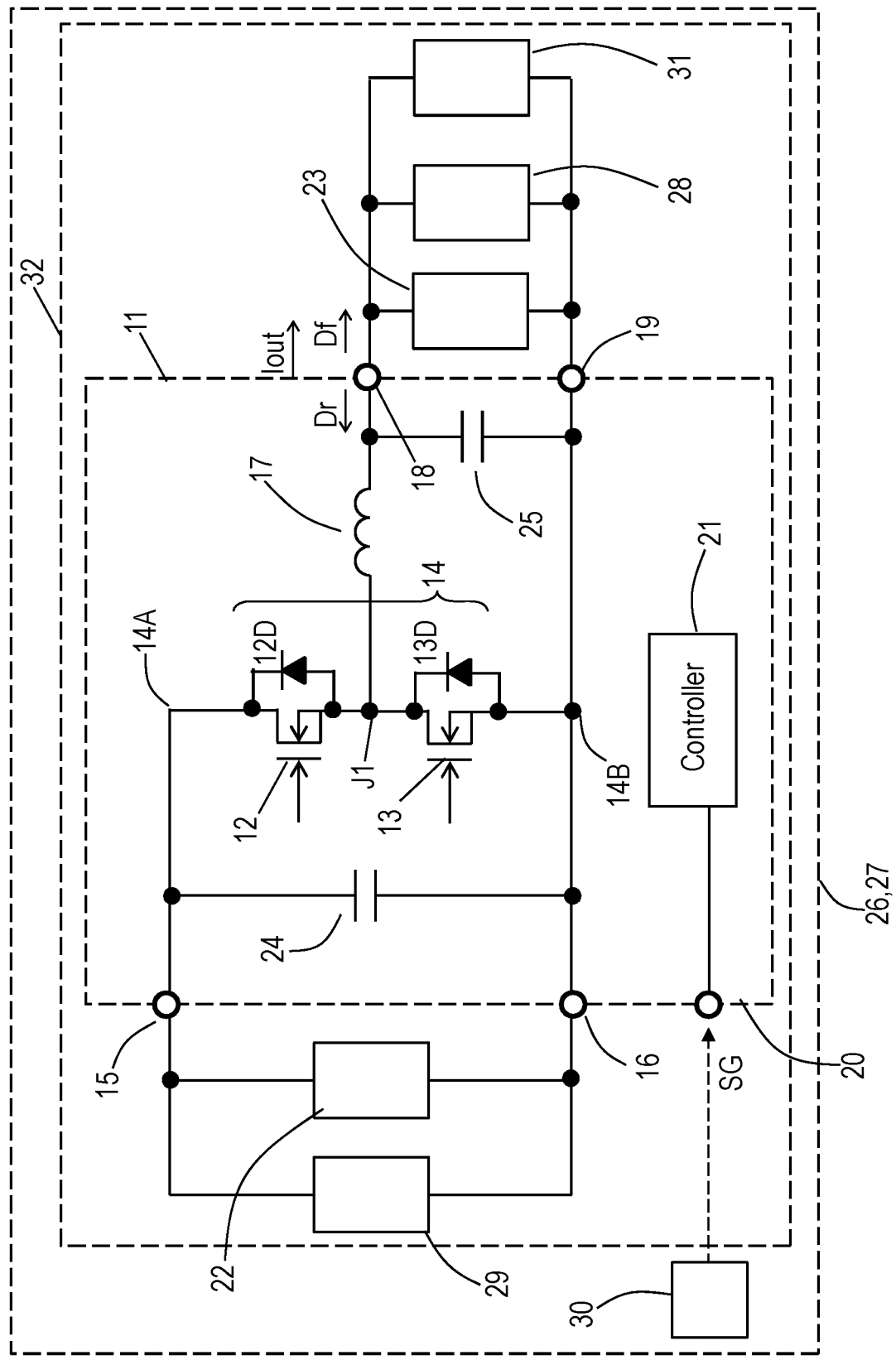
FIG. 2 is a circuit block diagram of a vehicle having the DC-DC converter mounted thereto according to the embodiment.
Figure 3:
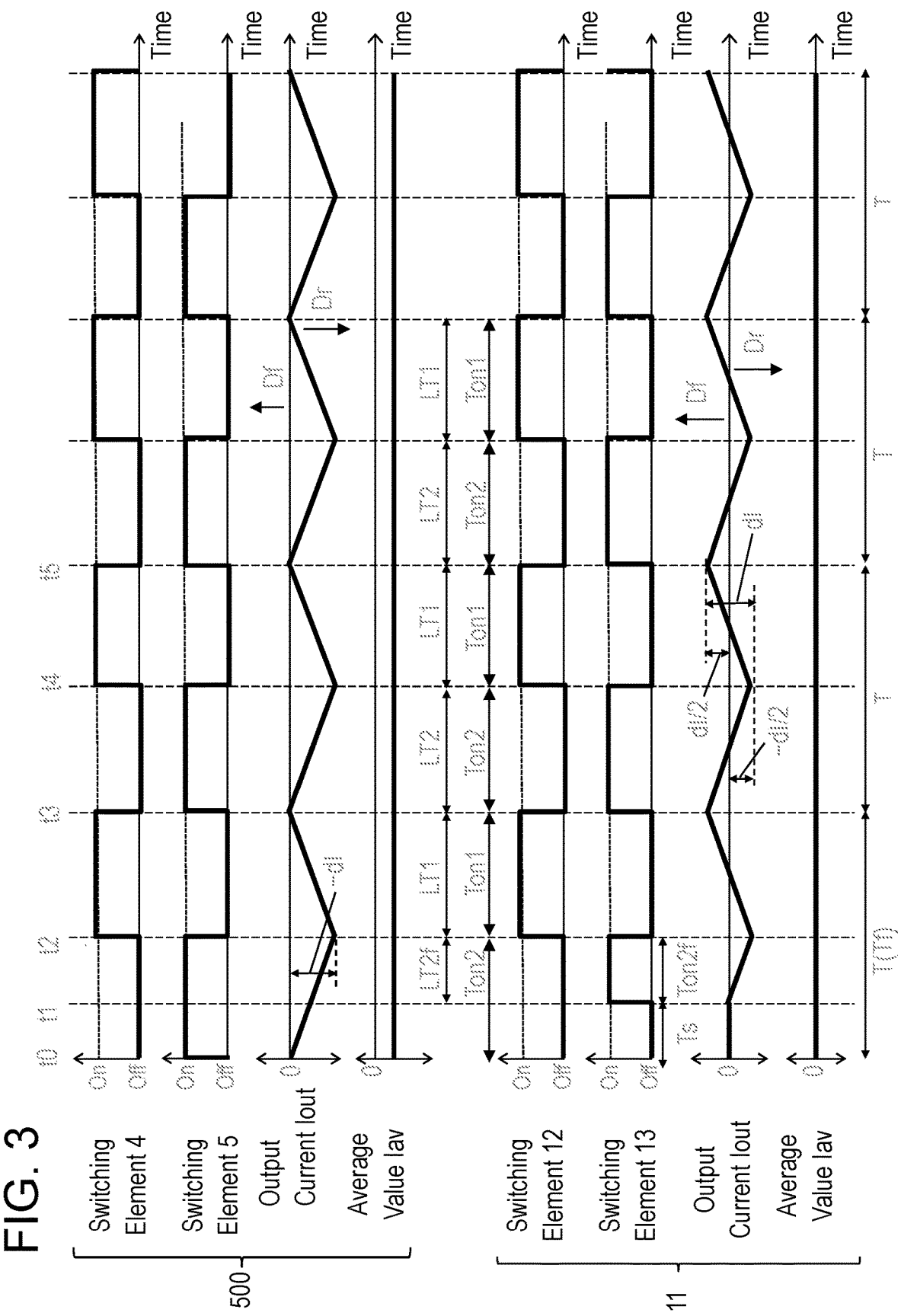
FIG. 3 illustrates an operation of the DC-DC converter according to the embodiment.

A configuration and operation of DC-DC converter 11 will be detailed below. FIG. 2 is a circuit block diagram of vehicle 26 having DC-DC converter 11 mounted thereto. FIG. 3 is a timing chart illustrating an operation of DC-DC converter 11.

The timing chart of FIG. 3 also illustrates an operation of DC-DC converter 500 as a comparative example. At start-up of DC-DC converter 500 of the comparative example, ON-period Ton1 and ON-period Ton2 are provided in this order in a firstly-appearing one of control cycles T. In this case, output current Iout decreases by amplitude dI in ON-period Ton2 from timing t0 to timing t2, and reaches a minimum value of −dI at timing t2 in firstly-appearing control cycle T. After that, output current Iout increases by amplitude dI in ON-period Ton1 from timing t2 to timing t3, and reaches a maximum value of zero within first control cycle T at timing t3.

Since the maximum value is zero mentioned above in DC-DC converter 500 of the comparative example, a steady output current that is an average value of output current Iout over control cycles T continuously has a negative value. DC-DC converter 11 according to the embodiment suppresses the output current Iout, which appears in the start-up of DC-DC converter 500 of the comparative example to a smaller value.

Configurations of DC-DC converter 11 and vehicle 26 having DC-DC converter 11 mounted thereto will be described below. DC-DC converter 11 includes series assembly 14 of switching elements 12 and 13 connected in series to each other, high-voltage positive end 15, high-voltage negative end 16, inductance element 17, low-voltage positive end 18, low-voltage negative end 19, start-up signal receiver 20, controller 21, input capacitor 24, and output capacitor 25.

High-voltage battery 22 has a positive electrode connected to high-voltage positive end 15, and has a negative electrode connected to high-voltage negative end 16. Low-voltage battery 23 has a positive electrode connected to low-voltage positive end 18, and has a negative electrode connected to low-voltage negative end 19. High-voltage battery 22 has rated voltage VHC while low-voltage battery 23 has rated voltage VLC. Rated voltage VHC is higher than rated voltage VLC.

DC-DC converter 11, high-voltage battery 22, and low-voltage battery 23 are mounted to body 27 of vehicle 26. In accordance with the embodiment, low-voltage battery 23 is, e.g. a storage battery configure to power auxiliary device 28 installed in vehicle 26. High-voltage battery 22 is a storage battery configured to power, e.g. driving load 29 installed in vehicle 26. DC-DC converter 11 performs a bidirectional operation. In other words, DC-DC converter 11 charges low-voltage battery 23 with power from high-voltage battery 22 in a stepping-down operation. DC-DC converter 11 charges high-voltage battery 22 with power from low-voltage battery 23 in a boosting-up operation.

Controller 21 includes a control circuit, a memory, a drive circuit, and a detection circuit. The control circuit, the memory, the drive circuit, and the detection circuit may be unitized to be provided in controller 21. Alternatively, the control circuit, the memory, the drive circuit, and the detection circuit may be distributed or integrated.

High-voltage positive end 15 is connected to one end 14A of series assembly 14, and high-voltage negative end 16 is connected to another end 14B of series assembly 14. Input capacitor 24 has one end connected to one end 14A of series assembly 14, and has another end connected to another end 14B of the series assembly 14. Alternatively, the one end of input capacitor 24 is connected to high-voltage positive end 15, and another end of input capacitor 24 is connected to high-voltage negative end 16. One end 17A of inductance element 17 is connected to node J1 at which switching elements 12 and 13 are connected to each other. Another end 17B of inductance element 17 is connected to low-voltage positive end 18. Low-voltage negative end 19 is connected to high-voltage negative end 16 or another end 14B of series assembly 14. Output capacitor 25 has one end connected to low-voltage positive end 18, and has another end connected to low-voltage negative end 19.

In the device shown in FIGS. 1 and 2, switching element 12 is illustrated as a high-potential-side arm, and switching element 13 is illustrated as a low-potential-side arm. Switching elements 12 and 13 are implemented by field-effect transistors (FETs), and may be implemented by other semiconductor switches, such as insulated-gate bipolar transistors (IGBTs). In the device shown in FIGS. 1 and 2, diodes 12D and 13D are connected parallel to switching elements 12 and 13, respectively. A cathode of diode 12D is connected to a positive electrode side of switching element 12, and an anode of diode 12D is connected to a negative electrode side of switching element 12. A cathode of diode 13D is connected to a positive electrode side of switching element 13, and an anode of diode 13D is connected to a negative electrode side of switching element 13. In the case that switching elements 12 and 13 include diodes 12D and 13D as parasitic diodes, respectively, external diodes 12D and 13D may not necessarily be connected.

Operations of DC-DC converter 11 and vehicle 26 having DC-DC converter 11 mounted thereto or operations of vehicle 26 having power supply device 32, including DC-DC converter 11, high-voltage battery 22, and low-voltage battery 23, mounted thereto will be described below.

When a driver in vehicle 26 activates start switch 30 to start up vehicle 26, start switch 30 transmits start-up signal SG to start-up signal receiver 20. At timing t0, controller 21 detects start-up signal SG via start-up signal receiver 20. Before timing t0, switching elements 12 and 13 are both turned off as an initial state. In other words, DC-DC converter 11 is not in operation in before timing t0.

Upon detecting the start-up signal SG at timing t0, controller 21 detects high-side voltage VH between high-voltage positive end 15 and high-voltage negative end 16. In other words, controller 21 detects high-side voltage VH which is a voltage of high-voltage battery 22 at timing t0. Controller 21 detects low-side voltage VL between low-voltage positive end 18 and low-voltage negative end 19. In other words, controller 21 detects low-side voltage VL which is a voltage of low-voltage battery 23. Controller 21 may detect high-side voltage VH and low-side voltage VL at the same time or at different timings. Considering a processing load of controller 21, controller 21 preferably detect high-side voltage VH and low-side voltage VL at different timings. However, even in that case, a time difference between these timings is generally as short as milliseconds, that is to say, less than or equal to a second. Therefore, there is no problem even if high-side voltage VH and low-side voltage VL are detected at different timings.

At timing t0, controller 21 generates a timer signal for timing of calculation and timing of control in controller 21. The timer signal is generated for each control cycle T having predetermined length LT. Length LT of control cycle T is predetermined or preliminary stored in controller 21. Length LT of control cycle T is determined based on, e.g. a circuit value of inductance element 17 or circuit values of inductance element 17 and output capacitor 25.

Based on of voltage VH of high-voltage battery 22 and voltage VL of low-voltage battery 23 detected by controller 21 at timing t0, controller 21 determines, by calculation, length LT1 of ON-period Ton1 in which switching element 12 is turned on and length LT2 of ON-period Ton2 in which switching element 13 is turned on. Length LT1 of ON-period Ton1 and length LT2 of ON-period Ton2 are determined to be values that prevent DC-DC converter 11 from charging and discharging both high-voltage battery 22 and low-voltage battery 23. In other words, bases on voltage VH and voltage VL, controller 21 determines lengths LT1 and LT2 of ON-periods Ton1 and Ton2, namely, the duty which is the ratio of length LT1 of ON-period Ton1 to length LT of control cycle T, or the duty which is the ratio of length LT2 of ON-period Ton2 to length LT of control cycle T, so that an average value of a current is zero to prevent a current from flowing through inductance element 17.

If detected voltages VH and VL are 50 V and 20 V, respectively, the ratio of length LT1 of ON-period Ton1 to length LT2 of ON-period Ton2 is about ⅔. In other words, the ratio of length LT1 of ON-period Ton1 to length LT of control cycle T is about ⅖. Length LT of control cycle T is the sum of length LT1 of ON-period Ton1, length LT2 of ON-period Ton2, and a length of a dead time. During the dead time, both switching elements 12 and 13 are turned off in order to prevent the current from flowing simultaneously due to a delay in operation or a rise time in reality. This configuration prevents the flow of overcurrent to high-voltage negative end 15 and high-voltage positive end 16 and damage to switching elements 12 and 13. In actual control, the dead time and circuit losses in DC-DC converter 11 cause the ratio of length LT1 of ON-period Ton1 to length LT2 of ON-period Ton2 not to be ⅔ exactly. In other words, the ratio of length LT1 of ON-period Ton1 to length LT of control cycle T is not set to be ⅖ exactly. In the operation illustrated in the timing chart of FIG. 3, for simplified illustration, detected voltages VH and VL are, for example, 24 V and 12V, respectively, and the ratio of length LT1 of ON-period Ton1 to length LT2 of ON-period Ton2 is set to be 1. Since the dead time is extremely shorter than ON-periods Ton1 and Ton2, the operation is described with the dead time omitted for convenience sake. Controller 21 turns on switching elements 12 and 13 complementarily. That is, controller 21 turns off switching element 13 while turning on switching element 12. Controller 21 turns off switching element 12 while turning on switching element 13. Controller 21 turns off both switching elements 12 and 13 during the extremely short dead time. Controller 21 does not turns on switching elements 12 and 13 simultaneously.

Upon determining lengths LT1 and LT2 of ON-periods Ton1 and Ton2, controller 21 starts the switching operation of switching elements 12 and 13. Lengths LT1 and LT2 of ON-periods Ton1 and Ton2 for control cycle T secondly provided and control cycles T subsequent to the secondly provided control cycle T in order to prevent DC-DC converter 11 from charging and discharging both high-voltage battery 22 and low-voltage battery 23.

Control cycle Tf among subsequently-repeating control cycles T which firstly starts from timing t0 includes ON-period Ton2 in which switching element 13 as the low-potential-side arm is turned on first. ON-period Ton2 includes initial ON-duration Ton2f having length LT2f shorter than length LT2 of ON-period Ton2 that has been determined by controller 21 by calculation. Initial ON-duration Ton2f of firstly-provided control cycle Tf starts from timing t1 after timing t0. Since the set ratio of length LT1 of ON-period Ton1 to length LT2 of ON-period Ton2 is 1 in the operation illustrated in FIG. 3, initial ON-duration Ton2f or ON-period Ton2 of firstly-provided control cycle Tf ends at timing t2, that is, at a half of control cycle Tf or control cycle T. Then, for ON-period Ton1 from timing t2 to timing t3, controller 21 turns on switching element 12 and turns off switching element 13.

As described above, initial ON-duration Ton2f starts from timing t1 that is after timing to. Therefore, while switching element 13 is turned on and switching element 12 is turned off, output current Iout flows through inductance element 17 in direction Dr shown in FIG. 3. However, since initial ON-duration Ton2f of control cycle Tf is shorter than ON-period Ton2, output current Iout reaches a minimum value −dI/2 at timing t2 in firstly-provided control cycle Tf. The output current Iout with a negative value shown in the timing chart of FIG. 3 flows in direction Dr through inductance element 17 shown in FIG. 1 or 2.

While switching element 12 is turned on and switching element 13 is turned off in ON-period Ton1 from timing t2 to timing t3, output current Iout flows in direction Df. The output current Iout increases by amplitude dI in ON-period Ton1 and reaches a maximum value dI/2 at timing t3 in firstly-provided control cycle Tf.

For secondly-provided control cycle T from timing t3 to timing t5 and each of subsequent control cycles T, controller 21 provides ON-periods Ton1 and Ton2 with predetermined lengths LT1 and LT2, respectively. The ratio of length LT1 of ON-period Ton1 to length LT2 of ON-period Ton2 is set to be 1 as mentioned above. Therefore, in ON-period Ton2 from timing t3 to timing t4, switching element 13 is turned on, and switching element 12 is turned off. In ON-period Ton1 from timing t4 to timing t5, switching element 12 is turned on, and switching element 13 is turned off.

In ON-period Ton2 from timing t3 to timing t4, the output current Iout decreases by amplitude dI and reaches the minimum value −dI/2 at timing t4 in secondly-provided control cycle T. In ON-period Ton1 from timing t4 to timing t5, output current Iout increases by amplitude dI and reaches the maximum value dI/2 at timing t5 in secondly-provided control cycle T.

Since controller 21 sets length LT2f of initial ON-duration Ton2f in firstly-provided control cycle Tf shorter than length LT2 of ON-period Ton2 that has been determined based on high voltage value VH1 and low voltage value VL1 by calculation, output current Tout reverses its polarity in every half of control cycle T with the maximum value dI/2 and the minimum value −dI/2 which have the same absolute value in control cycle T. This configuration drastically decreases a steady output current which is average value lay of output current Tout to about zero over single control cycle T or plural control cycles T. Moreover, a time for the output current to become the extremely-small steady current of about zero is about control cycle T. Thus, the steady output current becomes extremely small within an extremely short time by such a simple control.

The steady output current flowing toward one of switching elements 12 and 13 that is turned on first in the start-up of DC-DC converter 11 is suppressed by the simple control, and output current Tout is controlled nearly in the equilibrium state of flowing on average in neither of directions Dr and Df. As a result, the power supply associated with unwanted charging and discharging is minimized. This configuration suppresses the adverse effects, such as the characteristic degradation of high-voltage battery 22 and the characteristic degradation of low-voltage battery 23.

Length LT2f of initial ON-duration Ton2f in firstly-provided control cycle Tf is preferably short, about a half of length LT2 of ON-period Ton2 that controller 21 has determined based on high voltage value VH1 and low voltage value VL1. The steady output current which is average value lay of output current Tout becomes extremely small, about zero, over single control cycle T or plural control cycles T.

In the above-described example, length LT2f of initial ON-duration Ton2f in firstly-provided control cycle Tf is a half of length LT2 of ON-period Ton2, so that output current Iout flows through inductance element 17 in direction Dr at timing t2 and takes the minimum value −dI/2 in first control cycle Tf, thus providing a desired steady output current. However, length LT2f of initial ON-duration Ton2f in firstly-provided control cycle Tf is not limited to the half of length LT2 of ON-period Ton2. Length LT2f shorter than length LT2 also reduces the steady output current.

In the above description, since initial ON-duration Ton2f of firstly-provided control cycle Tf is shorter than ON-period Ton2 with length LT2 that controller 21 has determined by the calculation based on high voltage value VH1 and low voltage value VL1, output current Iout reverses its polarity with the maximum value and the minimum value having different polarities in control cycle Tf, thus suppressing the steady output current. In other words, the length of firstly-provided control cycle Tf is equal to lengths of secondly and subsequently provided control cycles T. Firstly-provided control cycle Tf includes ON-period Ton1, initial ON-duration Ton2f, and idle duration Ts that is from timing t0 to timing t1. Controller 21 turns off switching elements 12 and 13 in idle duration Ts. Although controller 21 turns on switching elements 12 and 13 on complementarily, controller 21 turns off switching elements 12 and 13 in idle period Ts in addition to the dead time.

Firstly-provided control cycle Tf may be shorter than secondly and subsequently-provided control cycles T, for example, by having a shorter length of idle duration Ts from timing t0 to timing t1 or no idle duration Ts. Firstly-provided control cycle Tf may include only ON-period Ton1 and initial ON-duration Ton2f.

In the above description of the operation of DC-DC converter 11, an operation of switching elements 12 and 13 particularly in firstly-provided control cycle Tf and an operation of switching elements 12 and 13 in secondly and subsequently-provided control cycles T. In the above description, the determination of lengths LT1 and LT2 of ON-periods Ton1 and Ton2 of DC-DC converter 11 is based on voltage VH of high-voltage battery 22 and voltage VL of low-voltage battery 23 that have been detected at timing t0. An operation of DC-DC converter 11 in secondly and subsequently-provided control cycles T in that case that reference voltage VHR for high-voltage battery 22 and reference voltage VLR for low-voltage battery 23 are different from at least one of detected voltage VH of high-voltage battery 22 and detected voltage VL of low-voltage battery 23 at timing t0. As long as the operation to be described here is performed in secondly and subsequently-provided control cycles T, the operation may be performed in thirdly-provided control cycle T and later control cycles T.

As described above, controller 21 detects voltage VH of high-voltage battery 22 and voltage VL of low-voltage battery 23 at timing t0. Controller 21 compares with detected voltage VH of high-voltage battery 22. Reference voltage VHR is preset or previously stored in controller 21 for high-voltage battery 22. Controller 21 also compares reference voltage VLR with detected voltage VL of low-voltage battery 23. Reference voltage VLR is preset or previously stored in controller 21 for low-voltage battery 23. The comparison of these voltages is performed at timing t0. Alternatively, the comparison of these voltages may be performed at any timing in control cycle Tf from timing t0 to timing t3.

If voltage VH of high-voltage battery 22 is different from reference voltage VHR for high-voltage battery 22 or deviates from reference voltage VHR for high-voltage battery 22 by a difference larger than a predetermined value, DC-DC converter 11 charges or discharges high-voltage battery 22 in secondly and subsequently-provided control cycles T to adjust voltage VH of high-voltage battery 22 and voltage VL of low-voltage battery 23 to reference voltages VHR and VLR, respectively.

When, for example, voltage VH is lower than reference voltage VHR, DC-DC converter 11 performs a boost-up operation of charging high-voltage battery 22 with power from low-voltage battery 23. When voltage VH is higher than reference voltage VHR, DC-DC converter 11 performs a stepping-down operation of discharging power from high-voltage battery 22 to charge low-voltage battery 23. In an alternative stepping down operation that DC-DC converter 11 may perform when voltage VH is higher than reference voltage VHR, power of high-voltage battery 22 is discharged to auxiliary device 28.

On the other hand, if voltage VL of low-voltage battery 23 is different from reference voltage VLR for low-voltage battery 23 or deviates from reference voltage VLR for low-voltage battery 23 by a difference larger than a predetermined value, DC-DC converter 11 charges or discharges low-voltage battery 23 in secondly and subsequently-provided control cycles T. Voltage VH of high-voltage battery 22 and voltage VL of low-voltage battery 23 are thus adjusted to reference voltages VHR and VLR, respectively.

When, for example, voltage VL is lower than reference voltage VLR, DC-DC converter 11 performs a stepping-down operation of charging low-voltage battery 23 with power from high-voltage battery 22. When voltage VL is higher than reference voltage VLR, DC-DC converter 11 performs a boost-up operation of discharging power from low-voltage battery 23 to charge high-voltage battery 22. In an alternative boosting-up operation that DC-DC converter 11 may perform when voltage VL is higher than reference voltage VLR, power of low-voltage battery 23 is discharged to driving load 29.

The above operations are just examples. When voltage VH of high-voltage battery 22 is lower than reference voltage VHR for high-voltage battery 22, and voltage VL of low-voltage battery 23 is lower than reference voltage VLR for low-voltage battery 23, controller 21 may cause power generation circuit 31 connected to low-voltage battery 23 to charge low-voltage battery 23 in secondly and subsequently-provided control cycles T so as to increase voltage VL of low-voltage battery 23 up to reference voltage VLR; meanwhile, DC-DC converter 11 may perform a boost-up operation of charging high-voltage battery 22 with power of power generation circuit 31 so as to increase voltage VH of high-voltage battery 22 up to reference voltage VHR.

The power supply from power generation circuit 31 to low-voltage battery 23 here is controlled by a vehicle controller. Alternatively, the power supply from power generation circuit 31 to low-voltage battery 23 may be controlled by controller 21. Power generation circuit 31 may include a power generator.

Since high-voltage battery 22 and low-voltage battery 23 that are mounted to vehicle 26 have large capacities, the steady output current may often have a large value suddenly changing. Accordingly, the steady output current is suppressed only in firstly-provided control cycle T or a limited number of control cycles T, and then, the control of the voltage to adjust it to an appropriate value is performed in subsequently-provided control cycles T. This configuration prevents sudden current inflow and significantly suppresses the adverse effects, such as degradation of characteristics of high-voltage battery 22 and low-voltage battery 23.

As mentioned earlier, in FIG. 1 and FIG. 2, switching element 12 and switching element 13 are illustrated as the high-potential-side arm and the low-potential-side arm, respectively. As described, the switching operation starts with turning on the low-potential-side arm, which is switching element 13, first in ON-period Ton2. In the operation that starts with switching element 13, switching element 13 starts operating with a negative potential applied between a drain and a source of the switching element, especially in the case that switching elements 12 and 13 are implemented by FETs. This configuration allows the switching operation of switching element 13 and subsequent switching operation of switching element 12 to be controlled respectively by low-voltage-value control signals.

Figure 4:
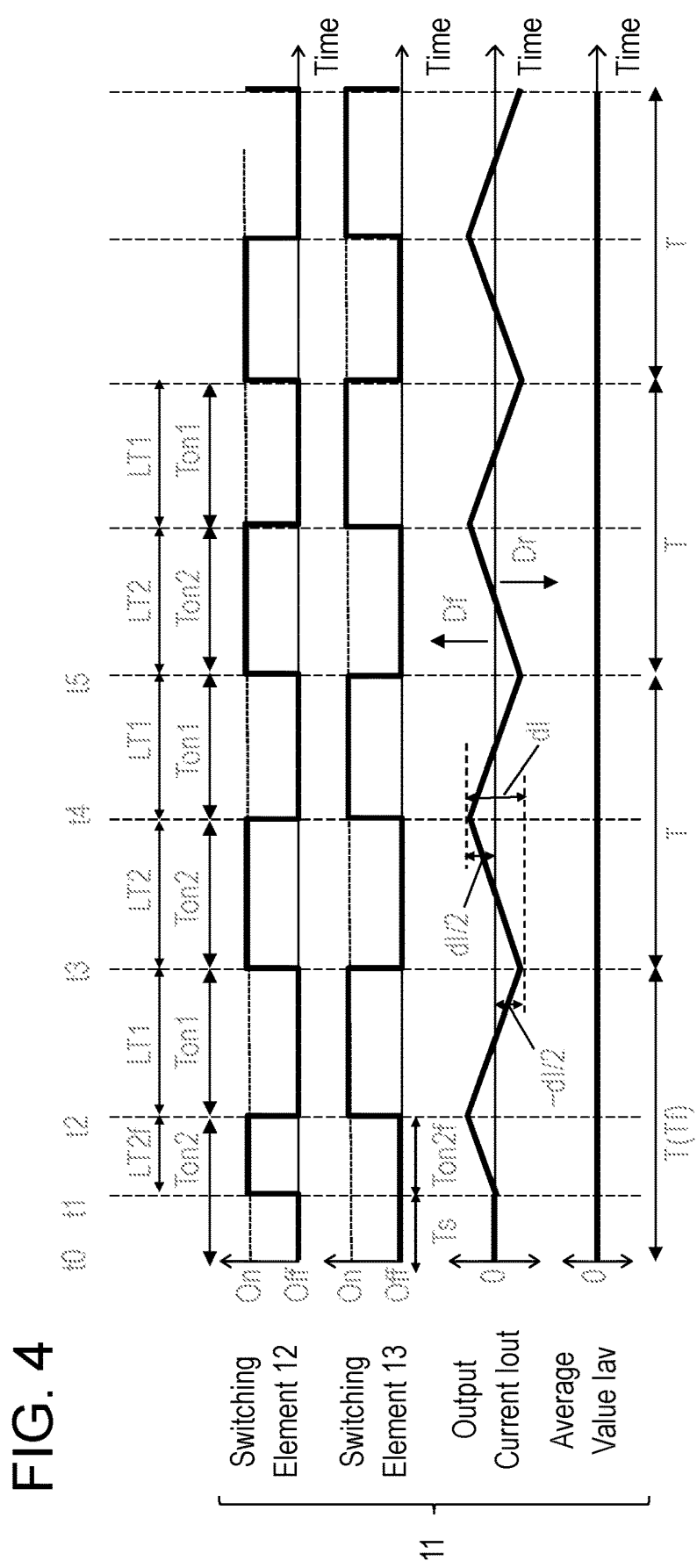
FIG. 4 is a timing chart illustrating another operation of the DC-DC converter according to the embodiment.

The switching operation may start with turning on switching element 12, which is the high-potential-side arm, if a bootstrap circuit is provided to supply a high-voltage control signal to switching element 12. FIG. 4 is a timing chart illustrating an operation of DC-DC converter 11 in this case. In FIG. 4, items identical to those of FIG. 3 are denoted by the same reference numerals. In the operation illustrated in FIG. 4, switching element 12 is turned on, and switching element 13 is turned off for ON-period Ton2 of control cycle T. Switching element 12 is turned off, and switching element 13 is turned on for ON-period Ton1. Therefore, for the cycle firstly provided, namely, for firstly-provided control cycle Tf, switching element 12 is turned on, and switching element 13 is turned off in initial ON-duration Ton2f. Then, switching element 12 is turned off, and switching element 13 is turned on in ON-period Ton1. Output current Iout has polarity reversed to output current Iout illustrated in FIG. 3. The operation illustrated in FIG. 4 allows average value Iav of output current Iout to become extremely small in value, that is, about zero similarly to the operation illustrated in FIG. 3.

High-voltage battery 22 may be a lead-acid battery, a lithium-ion battery, an electrical double-layer capacitor, or a lithium-ion capacitor. Similarly to high-voltage battery 22, low-voltage battery 23 may be a lead-acid battery, a lithium-ion battery, an electrical double-layer capacitor, or a lithium-ion capacitor.

As described above, controller 21 is configured to provide control cycles T subsequently repeated in response to start-up signal SG received by start-up signal receiver 20. Each of control cycles T includes ON-period Ton2 and ON-period Ton1 subsequent to ON-period Ton2. For ON-period Ton2, controller 21 turns on one of switching elements 12 and 13 and turns off another of switching elements 12 and 13. For ON-period Ton1, controller 21 turns off the one of switching elements 12 and 13 and turns on another of switching elements 12 and 13. Controller 21 is configured to determine length LT2 of ON-period Ton2 and length LT1 of ON-period Ton1 based on high-side voltage VH between high-voltage positive end 15 and high-voltage negative end 16 and low-side voltage VL between low-voltage positive end 18 and low-voltage negative end 19. Controller 21 turns on the one of switching elements 12 and 13 in initial ON-duration Ton2f included in ON-period Ton2 of firstly-provided control cycle Tf among control cycles T. Initial ON-duration Ton2f is shorter than determined length LT2 of ON-period Ton2. Controller 21 turns off switching element 12 and switching element 13 in a duration (idle duration Ts) in ON-period Ton2 of firstly-provided control cycle Tf other than the initial ON-duration. Controller 21 turns on the one of switching elements 12 and 13 and turns off another of switching elements 12 and 13 throughout determined length LT2 of ON-period Ton2 of one or more control cycles T other than firstly-provided control cycle Tf. Controller 21 turns off the one of switching elements 12 and 13 and turns on another of switching elements 12 and 13 throughout determined length LT1 of ON-period Ton1 of each of control cycles T.

Length LT2f of initial ON-duration Ton2f may be a half of determined length LT2 of ON-period Ton2.

In the first control cycle Tf, ON-period Ton1 may be subsequent to initial ON-duration Ton2f.

The one of switching elements 12 and 13 is switching element 12, and another of switching elements 12 and 13 is switching element 13.

Alternatively, the one of switching elements 12 and 13 is switching element 13, and another of switching elements 12 and 13 is switching element 12.

ON-period Ton2 of first control cycle Tf has a length shorter than determined length LT2 of ON-period Ton2.

REFERENCE MARKS IN THE DRAWINGS

11 DC-DC converter
12 switching element (first switching element)
13 switching element (second switching element)
14 series assembly
15 high-voltage positive end
16 high-voltage negative end
17 inductance element
18 low-voltage positive end
19 low-voltage negative end
20 start-up signal receiver
21 controller
22 high-voltage battery
23 low-voltage battery
24 input capacitor
25 output capacitor
26 vehicle
27 body
28 auxiliary device
29 power load to be driven
30 start switch
31 power generation circuit
32 power supply device
T control cycle
Ton1 ON-period (second ON-period)
Ton2 ON-period (first ON-period)
Ton2f initial ON-duration

The invention claimed is:

1. A DC-DC converter comprising:
a first switching element including one end and anther end;
a second switching element including one end and another end, the one end of the second switching element being connected to the one end of the first switching element at a node;
a high-voltage positive end connected to the another end of the first switching element;
a high-voltage negative end connected to the another end of the second switching element;
a low-voltage negative end connected to the another end of the second switching element;
an inductance element including one end and another end, the one end of the inductance element being connected to the node;
a low-voltage positive end connected to the another end of the inductance element;
a start-up signal receiver configured to receive a start-up signal; and
a controller configured to turn on the first switching element and the second switching element complementarily, wherein
the controller is configured to, such that an average value of a current flowing in the inductance element becomes substantially zero:
provide a plurality of control cycles subsequently in response to the start-up signal received by the start-up signal receiver, each of the plurality of control cycles consisting of a first ON-period and a second ON-period subsequent to the first ON-period;
turn on one of the first switching element and the second switching element and turn off another of the first switching element and the second switching element for the first ON-period;
turn off the one of the first switching element and the second switching element and turn on the another of the first switching element and the second switching element for the second ON-period;
determine a length of the first ON-period and a length of the second ON-period based on a high-side voltage between the high-voltage positive end and the high-voltage negative end and a low-side voltage between the low-voltage positive end and the low-voltage negative end;
turn on the one of the first switching element and the second switching element in an initial ON-duration in the first ON-period of a first control cycle among the plurality of control cycles which is firstly provided among the plurality of control cycles, the initial ON-duration having a length shorter than the determined length of the first ON-period, and turn off the first switching element and the second switching element in a duration of the first ON-period of the first control cycle other than the initial ON-duration;
turn on the one of the first switching element and the second switching element and turn off the another of the first switching element and the second switching element for the determined length of the first ON-period of each of one or more control cycles among the plurality of control cycles other than the first control cycle, the one or more control cycles among the plurality of control cycles other than the first control cycle being subsequent to the first control cycle; and
turn off the one of the first switching element and the second switching element and turn on the another of the first switching element and the second switching element for the determined length of the second ON-period of each of the plurality of control cycles; and
cause the length of the initial ON-duration to be a half of the determined length of the first ON-period.

2. The DC-DC converter of claim 1, wherein the second ON-period is subsequent to the initial ON-duration in the first control cycle.

3. The DC-DC converter of claim 1, wherein the one of the first switching element and the second switching element is the first switching element, and the another of the first switching element and the second switching element is the second switching element.

4. The DC-DC converter of claim 1, wherein
the one of the first switching element and the second switching element is the second switching element, and
the another of the first switching element and the second switching element is the first switching element.

5. The DC-DC converter of claim 1, wherein a length of the first ON-period of the first control cycle is shorter than the determined length of the first ON-period.

6. A power supply device comprising:
a DC-DC converter including
a first switching element including one end and anther end,
a second switching element including one end and another end, the one end of the second switching element being connected to the one end of the first switching element at a node,
a high-voltage positive end connected to the another end of the first switching element,
a high-voltage negative end connected to the another end of the second switching element,
a low-voltage negative end connected to the another end of the second switching element,
an inductance element including one end and another end, the one end of the inductance element being connected to the node,
a low-voltage positive end connected to the another end of the inductance element,
a start-up signal receiver configured to receive a start-up signal, and
a controller configured to turn on the first switching element and the second switching element complementarily;
a high-voltage battery connected to the high-voltage positive end and the high-voltage negative end; and
a low-voltage battery connected to the low-voltage positive end and the low-voltage negative end, wherein
the controller is configured to, such that an average value of a current flowing in the inductance element becomes substantially zero:
provide a plurality of control cycles subsequently in response to the start-up signal received by the start-up signal receiver, each of the plurality of control cycles consisting of a first ON-period and a second ON-period subsequent to the first ON-period;
turn on one of the first switching element and the second switching element and turn off another of the first switching element and the second switching element for the first ON-period;
turn off the one of the first switching element and the second switching element and turn on the another of the first switching element and the second switching element for the second ON-period;
determine a length of the first ON-period and a length of the second ON-period based on a high-side voltage between the high-voltage positive end and the high-voltage negative end and a low-side voltage between the low-voltage positive end and the low-voltage negative end;
turn on the one of the first switching element and the second switching element in an initial ON-duration in the first ON-period of a first control cycle among the plurality of control cycles which is firstly provided among the plurality of control cycles, the initial ON-duration having a length shorter than the determined length of the first ON-period, and turn off the first switching element and the second switching element in a duration of the first ON-period of the first control cycle other than the initial ON-duration;
turn on the one of the first switching element and the second switching element and turn off the another of the first switching element and the second switching element for the determined length of the first ON-period of each of one or more control cycles among the plurality of control cycles other than the first control cycle;
turn off the one of the first switching element and the second switching element and turn on the another of the first switching element and the second switching element for the determined length of the second ON-period of each of the plurality of control cycles; and
cause the length of the initial ON-duration to be a half of the determined length of the first ON-period.

7. The power supply device of claim 6, wherein the controller is configured to adjust a voltage of the high-voltage battery to a first reference voltage and adjust a voltage of the low-voltage battery to a second reference voltage in the one or more control cycles other than the first control cycle.

8. The power supply device of any one of claim 6, wherein the second ON-period is subsequent to the initial ON-duration in the first control cycle.

9. The power supply device of any one of claim 6, wherein
the one of the first switching element and the second switching element is the first switching element, and
the another of the first switching element and the second switching element is the second switching element.

10. The power supply device of any one of claim 6, wherein
the one of the first switching element and the second switching element is the second switching element, and
the another of the first switching element and the second switching element is the first switching element.

11. The power supply device of any one of claim 6, wherein a length of the first ON-period of the first control cycle is shorter than the determined length of the first ON-period.

* * * * *